United States Patent
Leon et al.

[19]

[11] Patent Number: 5,820,176
[45] Date of Patent: Oct. 13, 1998

[54] SECURITY SEAL AND LOCK

[75] Inventors: Jeremy Phelps Leon, Morris Township; Richard C. Dreisbach, North Arlington, both of N.J.

[73] Assignee: E.J. Brooks Company, Livingston, N.J.

[21] Appl. No.: 807,196

[22] Filed: Feb. 27, 1997

[51] Int. Cl.[6] ................................................ B65D 33/34
[52] U.S. Cl. ......................................................... 292/323
[58] Field of Search ................................... 292/323, 252, 292/307 R, 315, 319, 321, 325, 326, 327, 307 B, 318

[56] References Cited

U.S. PATENT DOCUMENTS

| | | |
|---|---|---|
| 590,188 | 1/1897 | Kuenzel . |
| 830,565 | 9/1906 | Brown . |
| 918,570 | 4/1909 | Mather . |
| 1,139,595 | 5/1915 | Starr . |
| 1,577,678 | 3/1926 | Behrman ................................. 292/318 |
| 3,770,307 | 11/1973 | Van Gompel . |
| 4,049,303 | 9/1977 | Irwin et al. . |
| 4,216,568 | 8/1980 | Anderson . |
| 4,640,538 | 2/1987 | Brammall . |
| 4,681,356 | 7/1987 | Brammall ................................ 292/327 |
| 4,747,631 | 5/1988 | Loynes et al. . |
| 5,092,641 | 3/1992 | Penick, Jr. . |
| 5,147,145 | 9/1992 | Facey et al. . |
| 5,222,776 | 6/1993 | Georgopoulos et al. ............... 292/323 |
| 5,352,003 | 10/1994 | Bystry . |
| 5,538,300 | 7/1996 | Brown ................................. 292/307 R |

FOREIGN PATENT DOCUMENTS 1880 of 1913 United Kingdom .

*Primary Examiner*—Kenneth J. Dorner
*Assistant Examiner*—Fredrick Conley
*Attorney, Agent, or Firm*—William Squire

[57] ABSTRACT

A preferably cast zinc housing has a chamber for receiving a metal stranded cable 1/16 inch in diameter which is swaged at one end to the housing in the chamber. The housing has a conical bore in communication with the ambient about the housing via apertures at opposing ends of the housing. A channel having a depth of about one half the cable diameter is in the bore surface aligned with the apertures to form a continuous cable insertion path with the apertures. A relatively weak coil spring and a pair of different diameter steel balls are in the conical bore. The cable free end is inserted into the path through the housing with minimal insertion resistance from the balls and spring. Withdrawal of the cable wedges the balls uniformly against the cable deforming it and locking the cable to the housing. The balls each uniformly stress the cable to spread the stress of the wedging action. This reduces stress concentration on the cable at each ball so that the cable fails only at its maximum tensile load.

19 Claims, 3 Drawing Sheets

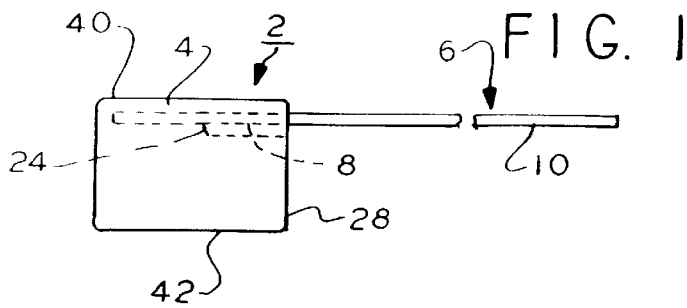
FIG. 1
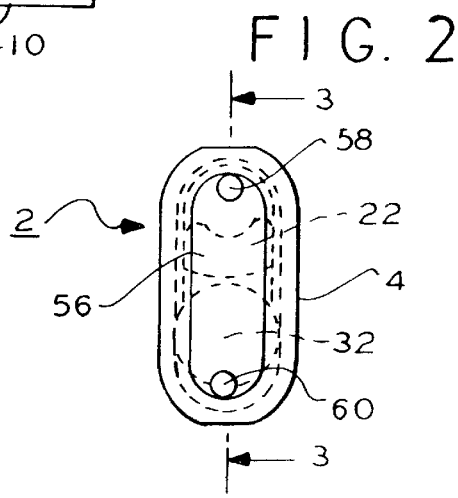
FIG. 2
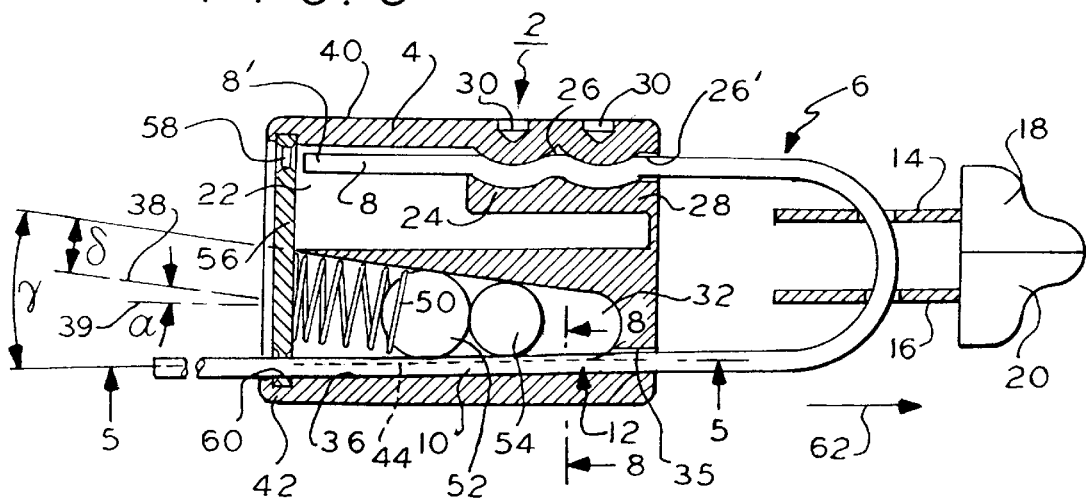
FIG. 3
FIG. 4
FIG. 5

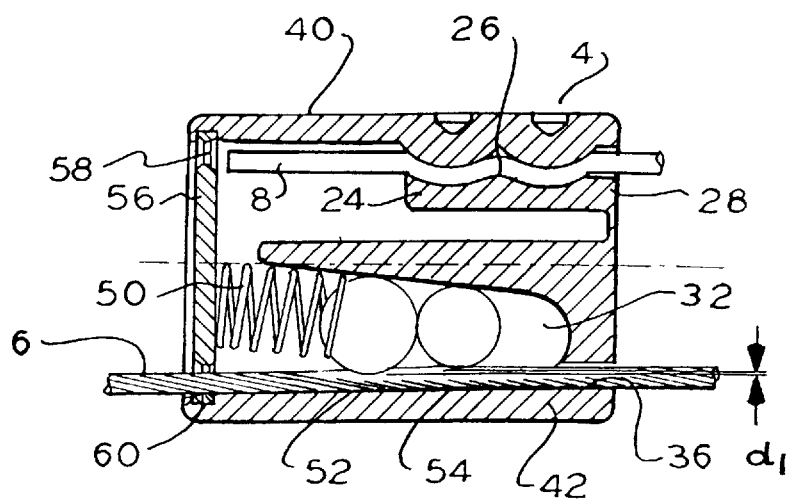
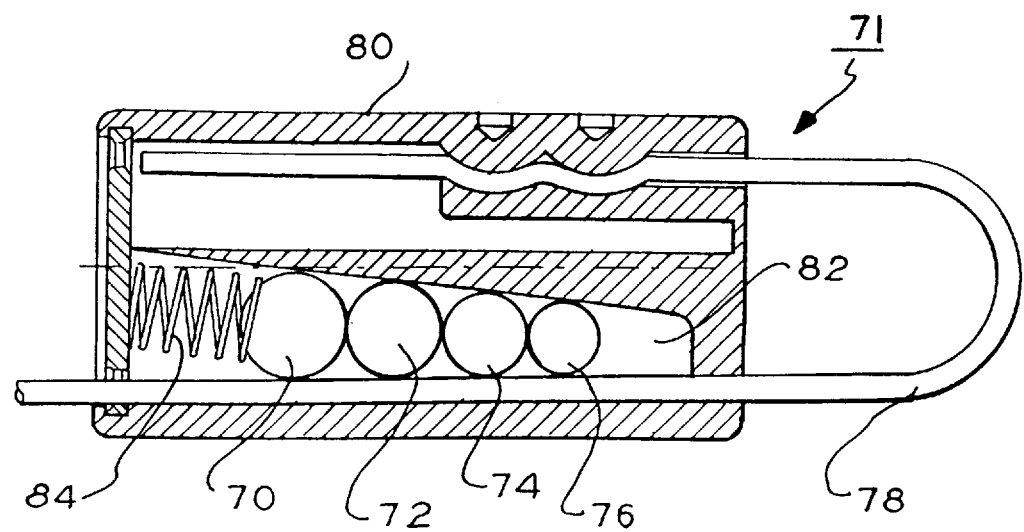

SECURITY SEAL AND LOCK

This invention relates to security seals, and more particularly, to a seal and lock employing a cable and a mechanism for securing a free end of the cable to the seal by wedging action within a tapered housing bore employing balls and the like.

Of interest is commonly owned U.S. Pat. No. 5,222,776, incorporated by reference herein, which discloses a security seal and lock of which the present invention is an improvement. In this patent a robust housing has a path for receiving a cable free end to be secured to the housing, the other cable end being secured to the housing. A tapered cavity is in the housing through which the path passes. The path is defined by cable entrance and exit holes in the housing and the cavity. A pair of balls are in the cavity and are biased by a spring toward the entrance hole and the small transverse dimension of the cavity.

The path is such that it is intercepted by the balls which are used for locking the cable to the housing to preclude withdrawal of the cable. The entrance hole is offset from the exit hole transversely to the general cable insertion direction. The balls and the offset holes provide a path for the cable during insertion which path is inclined relative to the general insertion direction. In practice, insertion of the cable along the path through the housing is required to lock the cable free end to the housing. Withdrawal of the inserted free end is precluded by the balls jamming against the inserted cable. A problem is present in that, while the disclosed seal works well, it is relatively difficult at times to insert the cable through the housing along the path. The lock device is used with a stranded cable which has a given tensile load capability. A further problem is that when employed in the lock device, the cable tends to fail at tensile loads significantly less than that of the cable maximum tensile load. This is undesirable.

The present inventors recognize a need for a seal and lock of the type described and disclosed in the aforementioned patent to have reduced insertion force for the cable. The present inventors also recognize that the path of the cable is intercepted by the balls and this contributes to the increased insertion force. They further recognize that in this type of security seal the spring always urges the balls toward the chamber smaller diameter. Thus the cable must always engage the balls during insertion. This engagement requires the cable during insertion to displace the balls against the spring creating the undesired insertion load. The present inventors also recognize a need for a seal and lock device of the type disclosed in the aforementioned patent in which the cable only fails in tension at the cable maximum tensile load.

A seal according to the present invention comprises a housing having a longitudinally extending bore with opposing first and second ends, at least the second end being in communication with the ambient about the housing through an aperture in the housing, the bore having a transverse dimension that decreases in a direction from the first end to the second end. The housing has a channel of a transverse width in communication with and along the bore and with the aperture forming a continuous path with the aperture. A first ball in the bore has a diameter smaller than the bore transverse dimension adjacent to the first end and larger than the bore transverse dimension adjacent to the second end. Bias means are in the bore at the first end for biasing the ball toward the second end. An elongated circular cylindrical flexible member is included having a free end for insertion into the bore at the second end through the aperture, the channel having a depth of at least 30% of the diameter of the elongated member. The bias means, bore, ball and elongated member are arranged such that a force on the elongated member to withdraw the cable free end from the housing bore toward the second end wedges the ball to the elongated member locking the elongated member to the housing in the bore.

As a result, the channel guides the elongated member, preferably a stranded cable, during insertion, provides a path for the member, decreases the degree of interference between the ball and the member during insertion and contributes to reducing the insertion load on the member.

In one aspect the seal includes a second ball in the bore and has a smaller diameter than the first ball and is located between the first ball and the second end, the balls each engaging the elongated member uniformly to reduce stress concentration on the elongated member to maximize the load capability of the member.

In a further aspect, the cable is stranded metal and has a second end swaged to the housing.

In a still further aspect, the bore is conical.

In a still further aspect, the channel has a uniform transverse width and a uniform depth for its entire length.

In a further aspect, the second ball is positioned to enhance the retention of the cable in cable channel during the insertion of the cable free end.

In a further aspect, the balls subtend an angle when contiguous that has a first value, the bore being conical and subtending a second angle at a second value, the first value being at least as great as the second value.

IN THE DRAWING:

FIG. 1 is a side elevation view of a seal and lock according to an embodiment of the present invention;

FIG. 2 is a front end view of the seal of FIG. 1;

FIG. 3 is a sectional view of the seal of FIG. 2 taken along lines 3—3;

FIG. 4 is a sectional plan view of the bore of the housing of FIG. 3 containing the balls and spring but without the spring and balls present showing a cable receiving channel in the bore;

FIG. 5 is a plan view of the embodiment of FIG. 3 taken along lines 5—5;

FIG. 9 is a view similar to the view of FIG. 3 useful for illustrating certain further principles of the invention; and FIG. 10 is a side sectional elevation view of a seal according to a further embodiment.

Figure 6:
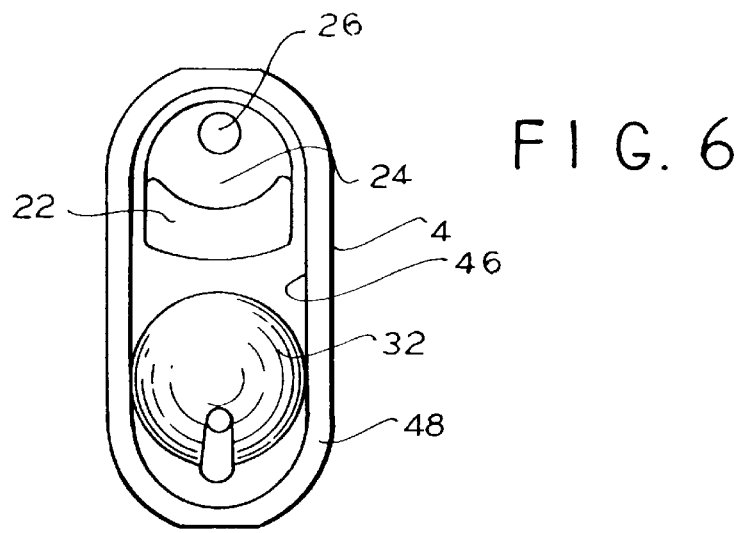
FIG. 6 is a front end view of the housing of the embodiment of FIG. 1 without the front lid, spring, cable and balls present, showing an upper cable receiving chamber and the lower conical cable locking bore.

In FIG. 1, a security seal and lock 2 comprises a preferably metal housing 4, preferably cast zinc, and a shackle cable 6, preferably a metal and preferably steel, stranded cable. The term "cable" as employed in the claims includes stranded or solid shackles made of metal or other materials. The cable 6 has by way of example a nominal diameter of about 1/16 inches (1.6 mm) in this embodiment. The cable 6 has one end 8 secured permanently to and internally of the housing. The cable 6 has a free end 10 that is inserted into the housing to be locked by locking mechanism 12, FIG. 3, internally of the housing 4. In FIG. 3, the free end 10 is first passed through openings in a pair of hasps 14, 16 for securing and locking respective structures 18, 20.

The housing 4, FIG. 3, has a chamber 22 for receiving the cable 6. In the chamber 22 is a boss 24 having a conduit 26 for closely receiving cable 6 end 8 therethrough. Conduit 26 normally is linear prior to insertion of the cable and securing the cable end 8 thereto. Conduit 26 has an aperture 26' in the housing end wall 28 for receiving the cable 6 end 8. The tip 8' at end 8 of the cable is in chamber 22 with a portion of the end 8 in the conduit 26.

To secure the end 8 to the housing 4, the cable end 8 in the conduit 26 is swaged in place by depressions 30. The depressions 30 distort the metal 24 and conduit 26 securing the cable end 8 to the boss 24.

The housing 4 has a preferably conical bore 32, FIGS. 3 and 4. The bore 32 has its largest transverse dimension adjacent to distal end 34 of the housing 4 opposite proximal end wall 28. The housing 4 has a cable 6 receiving aperture 35 in wall 28 in communication with bore 32. A channel 36 is formed in a surface of the bore 32 and is communication with the aperture 35 in wall 28 to form a continuous path therewith. The bore 32 and channel 36 terminate adjacent to the housing 4 distal end 34 in recess 46.

The bore 32 preferably has about a 3° taper along its length relative to the bore 32 axis 38 so that the bore conical angle is 6°. The axis 38 is inclined slightly at angle α to axis 39 which is normal to end wall 28 and parallel to the external surfaces of the side walls 40, 42. The channel 36 bottom surface is inclined about 1° relative to the bore 32 side wall 32' (FIG. 8) along the channel 36 length between ends 28 and 34. Thus, the bore 32 and channel 36 subtend an angle γ of about 70° The channel 36 inclination angle of about 1° is to provide a draft for molding purposes.

Figure 8:
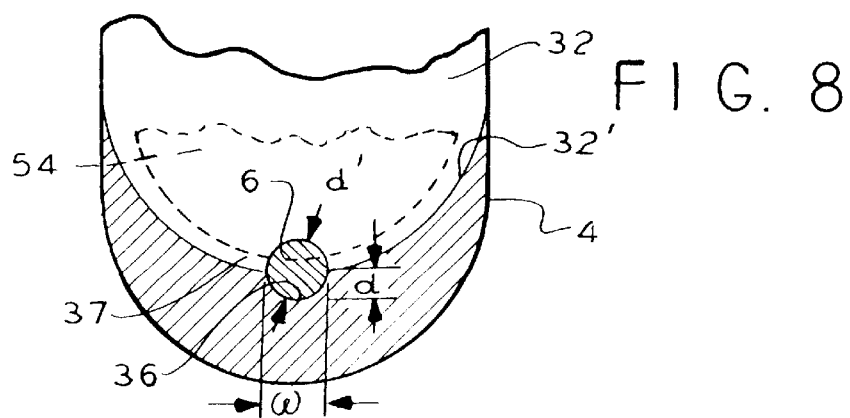
FIG. 8 is a sectional elevation view of the embodiment of FIG. 3 taken along lines 8—8.

In FIG. 8, the channel 36 has a depth d which is preferably one half of the diameter of the cable 6. For a 1/16 inch (1.6 mm) diameter cable, the channel has a depth d preferably of about 1/32 inches (0.8 mm). This results in only about one half of the cable 6 protruding above the channel into bore 32.

Also, the channel width w has a value that is preferably also about the same as the depth d value in this embodiment. The channel 36 width w and depth d each have a value that is substantially the same for the length of the channel notwithstanding the greater 1° relative inclination of the channel 36 bottom surface to the bore 32 side wall 32'. This 1° relative inclination does not substantially affect the channel width w and depth d which are maintained substantially constant for the channel length. The depth d has an important function as will be described below. While the depth d is preferably one half the value of the cable diameter it may be less or greater than this value according to a given implementation.

The channel 36 as described is of uniform depth and width for its entire length in the bore 32. The channel is preferably a circular segment based on a diameter, for example, which corresponds to the diameter of the cable to be received thereby. Preferably the channel is in side wall 42. Thus the channel 36 is inclined preferably about 4.5° relative to axis 38 and the path traversed by balls 52 and 54. That path is defined by the bore 32 and its axis 38.

The seal and lock described in the aforementioned patent '776 also has a channel in the lock housing tapered bore. The depth of the channel is a maximum of about 20% of the cable diameter which is unsatisfactory as recognized by the present inventors and as will be explained below.

The housing 4, FIG. 3, has an annular lip 48 which extends about the recess 46 at distal end 34. The locking mechanism 12 comprises a preferably metal compression coil spring 50 in the bore 32 adjacent to housing distal end 34. The spring 50 may be aligned on axis 38. This spring is longer and weaker than the spring disclosed in the aforementioned patent '776. A pair of preferably steel nickel plated balls 52 and 54 are in the bore 32 between the spring 50 and the proximal end of the bore 32 at wall 28. The ball 52 is contiguous with the spring 50 and is of larger diameter than the ball 54 which is between the ball 52 and the proximal end of the bore 32 at wall 28. When used with a stranded cable, the balls are contiguous in the bore 32 as shown in FIG. 3.

In a seal and lock using a solid metal wire as a shackle in the alternative to a stranded cable, the balls are normally spaced from one another, e.g., 0.020 inches (0.5 mm)) in this embodiment.

By way of example, ball 52 preferably may have a diameter of about 0.250 inches (6.4 mm) and the ball 54 may have a diameter of about 0.219 inches (5.5 mm) and bore 32 may have a radius R at its proximal end at wall 28 of about 0.117 inches (3 mm). The bore 32 may have a length of about 0.93 inches (23.6 mm) to recess 46.

Figure 7:
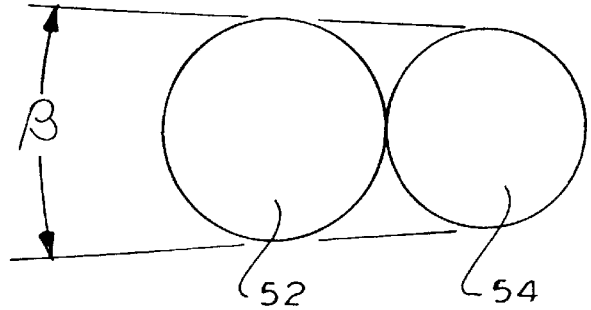
FIG. 7 is a more detailed view of the balls according to the embodiment of FIG. 3 useful for explaining some of the principles of the present invention.

These dimensions of the balls, FIG. 7, result in the contiguous balls in the bore 32 (not shown in FIG. 7) subtending an angle β of about 7.632°. This is greater than the 7° angle subtended by the cone of bore 32. These relative angles are important. The balls preferably should subtend an angle equal to or greater than the angle of the bore 32 cone but not significantly less.

A lid 56 is secured to the distal end 34 of the housing in recess 46. The lip 48 is then swaged over to secure the lid to the housing and enclose chamber 22 and the locking mechanism 12 in bore 32. In FIG. 2, the lid 56 has two apertures 58 and 60. Aperture 58 may receive the cable end 8 as desired in certain implementations. The aperture 60 receives the free end 10 of the cable 6 in the locking mode from bore 32.

The aperture 35, channel 36 and aperture 60 form a continuous linear path for the cable 6 end 10 during insertion of the cable into the housing. The channel 36 serves to guide the cable during its insertion along the path. The two balls 52 and 54 serve, in addition to locking the cable to the housing retain the cable in the insertion path during insertion.

In operation, the cable 6 free end 10 is passed through the hasps 14 and 16, FIG. 2. The cable free end 10 is then inserted into aperture 35 at proximal wall 28. The cable immediately then enters the channel 36. As the cable 6 is forced down the channel path it encounters the first ball 54. Because the cable is about 50% immersed into the channel, only about a 50% portion of the cable diameter protrudes above the channel and engages the ball 54. This portion then forces the ball in the bore 32 along axis 38 toward distal end 34. When the ball is sufficiently radially spaced from the channel 36, the cable is able to pass radially therebeneath. This action, in cooperation with a weaker spring 50, results in the cable encountering substantially less insertion resistance than the prior art device of the aforementioned U.S. Pat. No. 5,222,776 incorporated by reference herein.

The channel 36 provides a positive path for the cable during insertion. As the cable 6 passes radially aligned with the first ball 54, this ball keeps the cable in the channel during the insertion, The cable 6 then encounters the second larger ball 52. This ball is also pushed toward the distal end axially until the cable has sufficient room to pass beneath this ball in the channel 36. The resistance offered by this ball in response to the cable insertion is also minimal.

Both balls need merely be traversed an amount sufficient to clear only that portion of the cable projecting above the channel 36 into the bore 32. This cable portion thus reduces the insertion resistance accordingly. In practice, the cable passes readily through the housing in the path formed by the apertures 35 and 60 and the channel 36 with negligible resistance. The deeper channel 36 by defining a linear path and the balls 52 and 54 cooperate to contribute to reducing the insertion load needed to force the cable through the path. The cable is not bent during the insertion by avoiding a tortuous path which also cooperates to reduce insertion forces.

Another factor reducing the insertion load on the balls is the reduced spring load induced by the weaker spring 50. The weaker spring is possible due to the uniform coaction of the balls on the cable as described below. This action is contributed by reducing the angle of the bore 32 to 7° as compared to an angle of 8.5° subtended by the bore in the prior art bore. This reduced angle bore is relative to the balls as also explained more fully below. The bore 32 is also relatively elongated and conical which also contributes to permitting a longer weaker spring without substantially increasing the housing length. Further, a longer weaker spring can be used due to the increased depth of the channel 36 which provides additional room for the spring by reducing the exposure of the projecting portion of the cable in the bore 32.

The balls are normally biased in the withdrawal direction 62 toward proximal wall 28 by the spring 50. The balls being steel and relatively hard are forced radially into friction engagement with the cable 6 by the narrowing bore 32 conical wall. Upon withdrawal of the cable in direction 62, the friction engagement of the balls therewith pulls the balls in direction 62 assisted by the bias of spring 50. This action wedges the balls against the cable 6 compressing the cable. Since approximately 50% of the cable projects above the channel 36, the cable may be compressed approximately this amount by the wedging action with the balls adjacent to the surface of the bore 32 at the cable. At this time the cable is sufficiently engaged to lock it to the housing precluding its further withdrawal in direction 62.

An important aspect of the two balls 52 and 54 engaging the cable, FIG. 9, is that both balls perform about the same work in locking to and deforming the cable. That is, the two balls each substantially equally engage and deform the cable in the locking mode. This occurs notwithstanding the difference in the angles $\beta$ and $\gamma$ subtended by the balls and bore 32, respectively, where $2\delta$ is the bore 32 conical angle and $\gamma$ is $2\delta$ plus the added 1° taper of the channel 36. This difference in angles results in a negligible difference in penetration of the balls into the cable 6, a difference distance $d_1$, FIG. 9. This difference does not significantly affect the fact that both balls penetrate and deform the cable substantially uniformly in the locking mode, FIG. 3, as desired in the present invention. In the locking mode, the balls do not engage the bore 32 transverse sides as shown in FIG. 5 because of their engagement with the cable 6.

In FIG. 8, The ball 54, shown in phantom, for example, in the locking mode, crushes and deforms the cable 6 top half above the channel 36, flattening the protruding cable half at the ball. Both balls are of similar or same hardness so that they coact with the cable similarly spreading the locking action load uniformly to both balls. This uniform deformation does not occur in the prior art, and particularly, in the aforementioned patent '776. In practice, the two balls of the prior art each penetrate the cable a different amount so that effectively only one ball performs the significant locking action, the other ball precluding twisting removal of the cable.

The significance of providing uniform penetration of the cable by all of the balls is that the stress on the cable is distributed uniformly among the different balls. This is important because if one ball penetrates and deforms the cable more than the other, stress concentration occurs at the one ball. As a result, the individual strands of the cable break under tension at a lower load due to the stress concentration.

It can be shown that if the cable is capable of 960 LB (445.4 Kilogm) tensile load prior to tensile failure, the stress concentration of only one ball as in the prior art results generally in the cable failing at a significantly lower load than the maximum load for which the cable is designed. It is desired that the cable only break at its maximum load capability. If the cable breaks at a lower load, then such breakage is an undesirable variable.

A conical tapered bore 32 permits a number of balls to be stacked in the bore. There is a relationship between the strength of the seal (the term "strength" of seal refers to the load at which the cable breaks) and the number of balls used. The more balls used, with the understanding that the balls work in unison during the locking action with the cable, the stronger the seal. This is because more balls spread the stress over a larger area of the cable, minimizing undesirable stress concentration on a few strands.

This increased strength is important also for larger cables. Also, there is a relationship between the diameter of the balls and the strength of the seal. The larger the ball diameter, the stronger the seal for a given cable diameter. The larger diameter also spreads the stress over a larger area of the cable. When the cable is locked with a relatively small area, the cable strands break more readily because of the stress concentration on a few strands. A larger ball is not practical in some embodiments because the seal housing also needs to be made larger and possibly too bulky for its application A decrease in stress area on the cable creates a cutting effect on the cable. The cable breaks one strand at a time. When the cable is locked over a relatively large area, the stress is spread over this larger area, reducing the tendency of the cable to break at less than maximum tensile load.

The tensile strength of a looped steel stranded 1/16 inch (1.6 mm) diameter cable is about 960 LB (445.4 Kilogm). Employing two balls of diameters such that the balls do not lock uniformly on the cable is equivalent to using a single ball. A seal under test exhibited its 1/16 inch diameter stranded cable breaking at about 500–600 LB (232–278.4 Kilogm) using a single 1/8 inch (3.2 mm) diameter ball. A second test employing a seal with a 1/16 inch cable broke the cable at 700–800 LB (324.8–371.2 Kilogm) utilizing two balls wherein one ball performed most of the locking action and had a diameter of about 7/32 inches (5.6 mm). This test is the equivalent of using a single ball. In a third test, two balls 1/8 and 7/32 inches in diameter were used with a 1/16 inch diameter stranded cable. The balls in the third test worked in unison on the cable in the locking action. The cable broke at the cable maximum strength at 966 LB (448.2 Kilogm). Thus, there is a correlation of the number of balls and their diameters to the cable diameter and seal strength.

Thus, in FIGS. 3 and 9, employing two balls subtending an angle $\beta$ of about 7.5° and a bore conical taper of about 7°, using two balls of 0.250 and 0.219 inch diameters (6.4 mm and 5.6 mm), the balls consistently exhibit the same penetration relationship with the cable 6 when the balls axially traverse the bore 32.

Assume that one ball depresses the cable 0.010 inches (0.25 mm) then the other ball also depresses the cable about the same amount. If both balls do not engage the cable uniformly, then it is easier to twist the cable free of the lock. In this case then, a stronger spring is employed to counteract this twisting effect. This in turn undesirably increases the insertion load on the cable.

In FIG. 8, the channel 36 protects approximately one half the cable diameter from flattening and spreading to region 37 by compression of the ball 54. This retains the integrity of the cable over a greater area than the prior art employing a relatively shallow channel. Flattening of substantially the entire cable diameter also tends to weaken the cable in the presence of a tensile load. As a result, the deeper channel 36 contributes to maximizing the breaking load of the cable 6. While the channel depth is preferably one half or greater than the diameter of the cable, it could be somewhat less, e.g., about 30% or more if desired according to a given implementation.

The cable is locked to the balls by withdrawal from the housing. The cable is sufficiently locked to the housing by the wedging action such that twisting of the cable can not remove it from the path, the problem addressed by the prior aforementioned patent. The twisting loose of the cable from the housing is prevented by the two balls engaging different grooves of the outer cable surface as present in a stranded cable.

Further, in the prior patent '776 one of the balls is preferably softer than the other. This is not required in the present invention because both balls engage the cable uniformly, the need for which is not recognized in that patent.

While a stranded metal cable is shown, it will occur that shackles of other materials, such as solid metal or plastic wires may be utilized. Also, by utilizing larger diameter balls, the number of balls may be reduced. In the converse, if more balls are used depending upon other factors as discussed, smaller diameters may be used.

In FIG. 10, an embodiment of a seal 71 is shown utilizing four balls 70, 72, 74 and 76. The shackle 78 is a stranded cable. The housing 80 has a conical bore 82. A spring 84 urges the balls in the locking direction. The bore 82 has the same conical angle as the bore 32, FIG. 3. The balls 70, 72, 74 and 76 subtend the same angle as balls 52 and 54, FIG. 7. In this case balls 70, 72, 74 and 76 may have diameters of 0.286, 0.250, 0.219 and 0.191 inches respectively in this embodiment.

All of the balls work in unison to lock the shackle 78 to the housing 80. The stress concentration is spread over the four balls uniformly maximizing the break load of the cable to its design strength. It should be understood however, that the need for more balls is not essential if the minimum number of balls will cause the cable to break at is maximum load. Of course, more balls contribute to making the seal more tamper resistant. In the alternative, a sufficiently large single ball will reduce the stress concentration on a cable of a given diameter. This however, results in a larger locking seal housing. Therefore, various embodiments may be utilized according to a given implementation.

It will occur to one of ordinary skill that other modifications may be made to the disclosed embodiment without departing from the scope of the invention as defined in the appended claims. For example, one end of the cable need not be attached to the housing. Two locks of the type described herein can be used to secure each cable end independently of the other lock. Further, the housing may employ two or more locking mechanisms for locking two cables thereto independently of each other. Also, the housing may have secured thereto two separate cables with two locking mechanism, each for locking an end of a different cable thereto. In addition, the insertion path need not extend through the housing.

It is apparent in certain implementations that the insertion of a cable end into the housing will lock that end to the housing without passing the cable end beyond the housing at the opposing housing end. It is preferred to pass the cable through the housing during insertion to tighten the loop formed by the cable.

What is claimed is:

1. A seal comprising:
   a housing having a longitudinally extending bore with opposing first and second ends, at least the second end being in communication with the ambient about the housing through an aperture in the housing, the bore having a wall defining a transverse dimension; that decreases in value in a direction from the first end to the second end;

the housing having a channel of a transverse width in communication with and along the bore and with the aperture forming a continuous path with the aperture;

first and second balls in said bore each having a diameter smaller than said bore transverse dimension adjacent to said first end and larger than said bore transverse dimension adjacent to said second end, the second ball being smaller in diameter than the first ball and located between the first ball and the second end, said balls each contacting said wall and having a diameter such that the balls substantially uniformly depress the elongated member when wedged and are each larger than said channel so as to preclude substantial penetration into said channel;

bias means in the bore at said first end for biasing the ball toward said second end; and an elongated circular cylindrical flexible member having a free end for insertion into the bore at said second end through the aperture, said channel having a depth of at least 30% of the diameter of the elongated flexible member for receiving the elongated member during said insertion, said bias means, bore, ball and elongated member being arranged such that a force on said elongated member to withdraw the elongated member free end from the housing bore toward the second end wedges the ball to the elongated member for wedge locking the elongated member to the housing in said bore.

2. The seal of claim 1 wherein said balls are steel.

3. The seal of claim 1 wherein the elongated member is a cable comprising stranded metal and has a second end secured to the housing.

4. The seal of claim 3 wherein the housing has a chamber for receiving said cable second end, said second end being swaged to the housing in said chamber.

5. The seal of claim 1 wherein the bore is conical for substantially the length of the housing.

6. The seal of claim 1 wherein the path is linear and extends through the housing.

7. The seal of claim 1 wherein the channel has a width, the housing has a second aperture at said first end in communication with the bore and said channel, said apertures being circular and having a diameter of about the same as the width of said channel to form a continuous path through the housing.

8. The seal of claim 1 wherein the bore is annular and tapers uniformly from the larger transverse dimension toward the smaller transverse dimension in a longitudinal direction.

9. The seal of claim 1 wherein the channel has a substantially uniform transverse width and a uniform depth for its entire length.

10. The seal of claim 1 wherein the housing has a chamber for receiving a further elongated member end opposite the free end and including means for securing the further end to the housing in said chamber, the housing including a lid secured thereto and forming a housing end wall at said first end.

11. The seal of claim 1 wherein said second ball is positioned for enhancing the retention of said cable in said channel during said insertion of the elongated member free end.

12. A seal comprising:

a housing having opposing end walls and a longitudinally extending bore in the housing having proximal and distal ends, each end adjacent to a different wall, the bore having a wall defining a transverse dimension that decreases in a longitudinal direction from the bore distal end to the proximal end, said housing having a channel in said bore extending between said ends and forming a path;

said end walls each having an aperture in communication with the bore and channel at a corresponding bore end;

a pair of balls in said bore of different diameters and each contacting said wall and having a diameter smaller than said bore transverse dimension adjacent to said distal end and larger than said bore transverse dimension adjacent to said proximal end;

resilient means in the bore at said distal end for urging the balls toward said proximal end; and a flexible cable having a free end for insertion into the path through the end wall aperture at said proximal end, said channel for guiding the cable in said path during said insertion, said resilient means, bore, ball and cable being arranged such that a force on said cable to withdraw the cable free end from the housing toward the proximal end wedges the balls uniformly against the cable so that each ball locks the cable to the housing in said channel substantially to the same degree.

13. The seal of claim 12 including a further ball in said bore for retention of said cable in said channel during said insertion and for uniformly locking said cable to the housing.

14. The seal of claim 12 wherein the channel depth is at least 30% of the diameter of the cable.

15. The seal of claim 12 wherein the bore is conical, the channel having a substantially uniform depth extending along one surface of the housing forming the bore.

16. The seal of claim 12 wherein the balls are spherical and are of different diameters, the relative values of the diameters of the balls being such that the balls subtend an angle when contiguous that has a first value, the bore being conical and subtending a second angle at a second value, the first value having a magnitude at least as great as the second value.

17. The seal of claim 12 wherein the channel is of uniform depth and width along its length, the depth being about 50% of the diameter of the cable.

18. The seal of claim 12 wherein the cable has a second end swaged to the housing within a housing chamber.

19. The seal of claim 12 wherein the cable is steel and stranded, the balls are spherical and are of different diameters, the relative values of the diameters of the balls being such that the balls when contiguous subtending an angle greater than about 7° and the bore being conical and subtending an angle of about 7°, said channel having a width and a depth of about 0.03 inches.

* * * * *